(12) United States Patent
Proca et al.

(10) Patent No.: US 8,872,927 B2
(45) Date of Patent: Oct. 28, 2014

(54) FAST ZERO RECOVERY WITH ALPHA BLENDING IN GYROSCOPIC IMAGE STABILIZATION

(75) Inventors: Adrian Proca, Santa Cruz, CA (US); William Jacobs, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 593 days.

(21) Appl. No.: 13/206,433

(22) Filed: Aug. 9, 2011

(65) Prior Publication Data

US 2013/0038744 A1 Feb. 14, 2013

(51) Int. Cl.
*H04N 5/228* (2006.01)
*H04N 5/232* (2006.01)
*H04N 5/275* (2006.01)

(52) U.S. Cl.
CPC ........... *H04N 5/23261* (2013.01); *H04N 5/275* (2013.01); *H04N 5/23274* (2013.01)
USPC ....................................................... 348/208.2

(58) Field of Classification Search
CPC .................................. H04N 5/23261
USPC ....................................................... 348/208.2
See application file for complete search history.

(56) References Cited

U.S. PATENT DOCUMENTS

| 2001/0003170 A1* | 6/2001 | Schupfner ....................... 702/94 |
| 2005/0093890 A1* | 5/2005 | Baudisch ....................... 345/639 |
| 2010/0289907 A1* | 11/2010 | Nakano et al. ............. 348/208.4 |

\* cited by examiner

*Primary Examiner* — Usman Khan
(74) *Attorney, Agent, or Firm* — Patterson + Sheridan, LLP

(57) ABSTRACT

Systems and methods for performing fast zero recovery with alpha blending with digital image stabilization implemented in a digital camera. The digital camera includes a gyroscope to measure motion of the digital camera and processes the signals from the gyroscope to track the total displacement of an image sensor over a series of frames of video. If the motion is a sustained motion in a substantially uniform direction, then the digital camera recognizes the motion as a panning-type motion and activates a fast-zero recovery with alpha blending operation to retrace the displacement of active pixel locations to the center of the image sensor. Alpha blending is performed to smooth the transition from a normal image stabilization operation to the fast-zero recovery with alpha blending operation.

20 Claims, 8 Drawing Sheets

| 200 | 201 | 202 | 203 | 204 | 205 | 206 | 207 | 208 | 209 |
| --- | --- | --- | --- | --- | --- | --- | --- | --- | --- |
| 210 | 211 | 212 | 213 | 214 | 215 | 216 | 217 | 218 | 219 |
| 220 | 221 | 222 | 223 | 224 | 225 | 226 | 227 | 228 | 229 |
| 230 | 231 | 232 | 233 | 234 | 235 | 236 | 237 | 238 | 239 |
| 240 | 241 | 242 | 243 | 244 | 245 | 246 | 247 | 248 | 249 |
| 250 | 251 | 252 | 253 | 254 | 255 | 256 | 257 | 258 | 259 |
| 260 | 261 | 262 | 263 | 264 | 265 | 266 | 267 | 268 | 269 |
| 270 | 271 | 272 | 273 | 274 | 275 | 276 | 277 | 278 | 279 |
| 280 | 281 | 282 | 283 | 284 | 285 | 286 | 287 | 288 | 289 |
| 290 | 291 | 292 | 293 | 294 | 295 | 296 | 297 | 298 | 299 |

100

| 200 | 201 | 202 | 203 | 204 | 205 | 206 | 207 | 208 | 209 |
| --- | --- | --- | --- | --- | --- | --- | --- | --- | --- |
| 210 | 211 | 212 | 213 | 214 | 215 | 216 | 217 | 218 | 219 |
| 220 | 221 | 222 | 223 | 224 | 225 | 226 | 227 | 228 | 229 |
| 230 | 231 | 232 | 233 | 234 | 235 | 236 | 237 | 238 | 239 |
| 240 | 241 | 242 | 243 | 244 | 245 | 246 | 247 | 248 | 249 |
| 250 | 251 | 252 | 253 | 254 | 255 | 256 | 257 | 258 | 259 |
| 260 | 261 | 262 | 263 | 264 | 265 | 266 | 267 | 268 | 269 |
| 270 | 271 | 272 | 273 | 274 | 275 | 276 | 277 | 278 | 279 |
| 280 | 281 | 282 | 283 | 284 | 285 | 286 | 287 | 288 | 289 |
| 290 | 291 | 292 | 293 | 294 | 295 | 296 | 297 | 298 | 299 |

| 200 | 201 | 202 | 203 | 204 | 205 | 206 | 207 | 208 | 209 |
|-----|-----|-----|-----|-----|-----|-----|-----|-----|-----|
| 210 | 211 | 212 | 213 | 214 | 215 | 216 | 217 | 218 | 219 |
| 220 | 221 | 222 | 223 | 224 | 225 | 226 | 227 | 228 | 229 |
| 230 | 231 | 232 | 233 | 234 | 235 | 236 | 237 | 238 | 239 |
| 240 | 241 | 242 | 243 | 244 | 245 | 246 | 247 | 248 | 249 |
| 250 | 251 | 252 | 253 | 254 | 255 | 256 | 257 | 258 | 259 |
| 260 | 261 | 262 | 263 | 264 | 265 | 266 | 267 | 268 | 269 |
| 270 | 271 | 272 | 273 | 274 | 275 | 276 | 277 | 278 | 279 |
| 280 | 281 | 282 | 283 | 284 | 285 | 286 | 287 | 288 | 289 |
| 290 | 291 | 292 | 293 | 294 | 295 | 296 | 297 | 298 | 299 |

FAST ZERO RECOVERY WITH ALPHA BLENDING IN GYROSCOPIC IMAGE STABILIZATION

BACKGROUND

1. Technical Field

The present disclosure relates generally to digital image stabilization and, more specifically, to fast zero recovery with alpha blending in gyroscopic image stabilization.

2. Description of the Related Art

Many digital camera systems implement a technique for attenuating small amounts of camera motion in a digital video captured by the digital camera. For example, some digital camera systems may place the image sensor on a platform that includes a mechanical damping system for attenuating high frequency motion. Other digital camera systems may implement an image stabilization algorithm in hardware or software by generating each frame of the digital video from a different portion of the image sensor or by cropping each frame of the digital video such that the origin of the frame is fixed on one point in the captured image and scaling the cropped frame to fit the resolution of the video format.

Many of these techniques suffer from deficiencies that introduce artificial motion into the digital video. For example, a technique that implements motion attenuation with a mechanical system, such as by using springs and dampers, may cause the image sensor to move after all motion of the camera has stopped due to the potential energy stored in the springs during the motion. In another example, many conventional digital image stabilization algorithms build up a large displacement during a motion which is then slowly retraced back to the center of the image sensor only after the camera motion is complete. The digital video captured using these systems may include a "rubber-band" effect where the apparent motion of the camera reverses towards the end of the motion to retrace the offset back to the center of the image sensor.

Accordingly, there is a need in the art for systems and methods that retrace the offset of the image back to the center of the image sensor without introducing noticeable motion artifacts.

BRIEF DESCRIPTION OF THE DRAWINGS

So that the manner in which the features of the present disclosure can be understood in detail, a more particular description may be had by reference to example embodiments, some of which are illustrated in the appended drawings. It is to be noted, however, that the appended drawings illustrate only example embodiments and are therefore not to be considered limiting in scope, for the disclosure may admit to other equally effective embodiments.

FIG. 5A is a conceptual illustration of active pixel locations of image sensor, according to one example embodiment;

FIG. 5B is a conceptual illustration of active pixel locations of image sensor for a digital camera that implements digital image stabilization, according to one example embodiment;

For clarity, identical reference numbers have been used, where applicable, to designate identical elements that are common between figures. It is contemplated that features of one example embodiment may be incorporated in other example embodiments without further recitation.

DESCRIPTION OF EXAMPLE EMBODIMENTS

Figure 1:
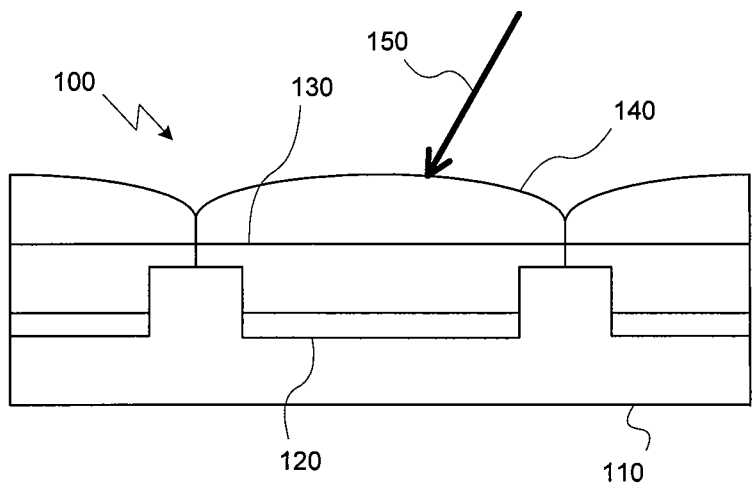
FIGS. 1 and 2 illustrate an image sensor, according to one example embodiment.

In the following description, numerous specific details are set forth to provide a more thorough understanding of various example embodiments. However, it will be apparent to one of skill in the art that certain embodiments may be practiced without one or more of these specific details. In other instances, well-known features have not been described in order to avoid obscuring the disclosure.

Overview

One example embodiment sets forth a method comprising receiving motion feedback data via a sensor that indicates motion associated with a digital camera, and identifying a plurality of active pixel locations based on the motion feedback data that comprises a subset of all pixel locations associated with an image sensor of the digital camera, where each active pixel location is offset from a corresponding pixel location associated with the image sensor that has a zero offset. The method further includes the steps of, determining, based on the motion feedback data, that the digital camera is being panned, and activating a fast-zero recovery with alpha blending operation that causes the offset associated with each active pixel location to approach a zero offset during the panning motion.

Another example embodiment sets forth a computer-readable medium including instructions that, when executed by a processing unit, cause the processing unit to perform the steps of receiving motion feedback data via a sensor that indicates motion associated with a digital camera, and identifying a plurality of active pixel locations based on the motion feedback data that comprises a subset of all pixel locations associated with an image sensor of the digital camera, where each active pixel location is offset from a corresponding pixel location associated with the image sensor that has a zero offset. The steps further include determining, based on the motion feedback data, that the digital camera is being panned, and activating a fast-zero recovery with alpha blending operation that causes the offset associated with each active pixel location to approach a zero offset during the panning motion.

Yet another example embodiment sets forth a system comprising an image sensor and a processing unit. The image sensor is associated with a digital camera and includes a plurality of pixel locations. The processing unit is configured to receive motion feedback data via a sensor that indicates motion associated with the digital camera, and identify a plurality of active pixel locations based on the motion feedback data that comprises a subset of all pixel locations associated with the image sensor, where each active pixel location is offset from a corresponding pixel location associated with the image sensor that has a zero offset. The processing unit is further configured to determine, based on the motion feedback data, that the digital camera is being panned, and activate a fast-zero recovery with alpha blending operation that causes the offset associated with each active pixel location to approach a zero offset during the panning motion.

One advantage of the disclosed technique is that a user cannot easily recognize that the offset in the active pixel locations are being retraced back to the center of the image sensor. Many conventional image stabilization algorithms simply allow the offset to saturate the image sensor during the pan such that the offset is at a maximum when the pan ends. Other image stabilization algorithms disable the image stabilization during the pan such that the offset at the start of the pan is the offset at the end of the pan. By retracing the offset back to the center of the image sensor during the panning motion, the retrace motion is hidden by the panning motion of the camera and the offset is centered on the image sensor at the end of the pan.

DETAILED DESCRIPTION OF THE FIGURES

Figure 2:
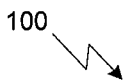

FIGS. 1 and 2 illustrate an image sensor 100, according to one example embodiment. Image sensor 100 may be a charge coupled device (CCD) or a complementary metal oxide semiconductor (CMOS) pixel sensor. As shown in FIG. 1, image sensor 100 may include a silicon substrate 110 that includes a pixel location 120. Pixel location 120 collects charge proportional to the number of photons that strike the photosensitive area of pixel location 120. Located above pixel location 120 is a color filter 130 that allows photons with a wavelength in a specific region of visible light to pass through. Without color filter 130, pixel location 120 would generate a voltage based on the amount of photons of every wavelength that strike the photosensitive area of pixel location 120. With color filter 130, pixel location 120 is configured to generate a voltage that is proportional to the intensity of visible light corresponding to the frequency pass band of the given color filter 130 that strikes the photosensitive area of pixel location 120. Microlens 140 is located above color filter 130 and focuses photons 150 towards the photosensitive area of pixel location 120. Image sensor 100 may include integrated circuit components (not shown) built into silicon substrate 110 around the perimeter of pixel location 120.

As shown in FIG. 2, image sensor 100 includes a two-dimensional array of pixel locations 200-299 arranged on silicon substrate 110. In one embodiment, image sensor 100 is configured with a color filter array (CFA) in a Bayer Filter Mosaic pattern (i.e., a repeating pattern of a 2×2 array with a green color filter over the upper left pixel location, a red color filter over the upper right pixel location, a blue color filter over the lower left pixel location, and a second green color filter over the lower right pixel location). In alternative embodiments, image sensor 100 includes a different type of CFA such as CMYW (Cyan Magenta Yellow White) CFAs, RGBW (Red Green Blue White) CFAs, or RGBE (Red Green Blue Emerald) CFAs. In yet other embodiments, each pixel location of image sensor 100 may sense the intensity of a plurality of color channels without the use of a CFA, such as by separating the different wavelengths of light using dichroic mirrors or using vertically stacked active pixel sensors. It will be appreciated that any image sensor 100 having an array of pixel locations may implement one or more aspects of the present disclosure.

In one embodiment, the CFA integrates color filters corresponding to three separate color channels into the image sensor 100 to generate intensity values for each pixel location (200, 201, etc.) corresponding to a red color channel, a green color channel, or a blue color channel. Each pixel location of image sensor 100 stores an intensity of light for one of the three color channels. The pixel locations 200-299 of image sensor 100 are arranged such that each 2×2 block of pixel locations, when sampled, corresponds to two intensity values of a green color channel as well as one intensity value of a red color channel and one intensity value of a blue color channel. For example, the first row of pixel locations in image sensor 100 includes pixel locations 200-209. Pixel locations 200, 202, 204, 206, and 208 each store an intensity value corresponding to the green color channel. Pixel locations 201, 203, 205, 207 and 209 each store an intensity value corresponding to the red color channel. The second row of pixel locations includes pixel locations 210-219. Pixel locations 210, 212, 214, 216, and 218 each store an intensity value corresponding to the blue color channel. Pixel locations 211, 213, 215, 217, and 219 each store an intensity value corresponding to the green color channel. The remaining pixel locations (i.e., pixel locations 220-299) are arranged in a repeating pattern similar to the first and second rows of pixel locations of image sensor 100.

When a digital camera captures an image via image sensor 100, one or more pixel locations in image sensor 100 are sampled to generate an intensity value for one of the three color channels of a pixel in the digital image. For example, in order to generate a digital image in an RGB format (where each pixel in the digital image stores an intensity value for each of the red, green, and blue color channels), a 2×2 block of pixel locations in the digital image are sampled to generate one pixel in the digital image. In one embodiment, the sampled values of pixel location 200 and pixel location 211 are averaged to calculate an intensity value for the green color channel of the upper left pixel in a digital image generated via image sensor 100. The sampled value of pixel location 201 corresponds to the red color channel of the upper left pixel and the sampled value of pixel location 210 corresponds to the blue color channel of the upper left pixel. In some alternative embodiments, each pixel of the digital image may correspond to a block size that is larger than 2×2 pixel locations in image sensor 100. For example, each pixel of the digital image may include filtered intensity values generated based on a plurality of samples from a 3×3 block of pixel locations. Each color channel of the corresponding pixel is an interpolated value from a subset of pixel locations in the 3×3 block. One such filter that may be implemented by a digital camera is a Gaussian filter of a 3×3 block of pixels, where each of the eight pixel locations surrounding a central pixel location that are associated with a color channel contributes to at least a portion of the intensity value for that color channel of the corresponding pixel in the digital image based on the distance of the pixel location from the central pixel location.

Figure 3:
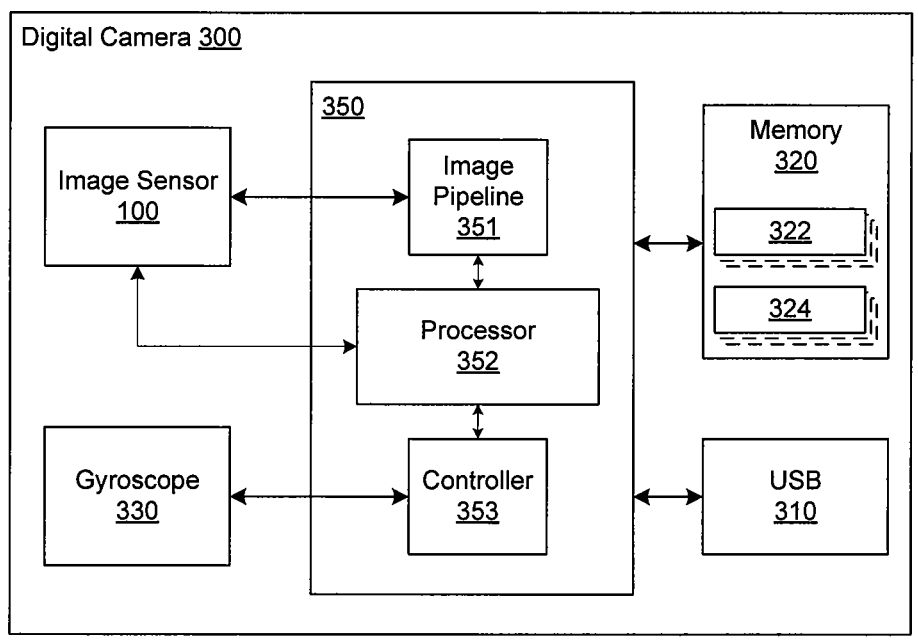
FIG. 3 illustrates a digital camera configured to implement gyroscopic digital image stabilization, according to one example embodiment.

FIG. 3 illustrates a digital camera 300 configured to implement gyroscopic digital image stabilization, according to one example embodiment. As shown, digital camera 300 includes an image sensor 100, described above, a gyroscope 330, a processing unit 350, a memory 320, and a USB™ interface 310. In one embodiment, processing unit 350 is a system-on-chip (SOC) that includes a digital image processing pipeline 351, a processor 352, and a controller 353. In alternative embodiments, one or more components of processing unit 350 may be implemented on separate chips. Memory 320 stores data and firmware for digital camera 300. In one embodiment, memory 320 may include volatile memory such as dynamic random access memory (DRAM) as well as non-volatile memory such as a flash memory. The non-volatile memory may include a non-removable flash device that stores the firmware of digital camera 300. In some embodiments, the non-volatile memory may also include a removable flash memory device such as an SD card. Digital camera 300 may store digital images 322 as well as digital videos 324 in the non-volatile memory of memory 320. Digital camera 300 may include a communications interface such as USB™ interface 310, or some other technically feasible communication interface, to transmit the digital images 322 or digital videos 324 to a peripheral device.

In one embodiment, processor 352 executes firmware for the digital camera 300 that is configured to control the different functions and operations of the digital camera 300 such as triggering the capture of raw image sensor data, displaying a user interface on an liquid crystal display (LCD) (not shown), monitoring input from controls, and other like functions. Processor 352 also implements the digital image stabilization algorithm described below. In one embodiment, processor 352 is a reduced instruction set computer (RISC). Digital image processing pipeline 351 receives raw image sensor data from image sensor 100 and generates a digital image 322. One example embodiment of digital image processing pipeline 351 is illustrated below in conjunction with FIG. 4.

Controller 353 implements a serial interface to communicate with gyroscope 330. Gyroscope 330 is a sensor configured to generate velocity data that indicates a motion of digital camera 300. In one embodiment, gyroscope 330 is configured to indicate a rotational velocity of the digital camera 300 in two dimensions, such as around an x-axis and around a y-axis. The x-axis corresponds to horizontal motion in the relative direction of pixel location 200 to pixel location 209 of image sensor 100, and the y-axis corresponds to vertical motion in the relative direction of pixel location 200 to pixel location 290 of image sensor 100. The amount of rotation around an axis may be used to generate an expected displacement of the image on the image sensor 100. Gyroscope 330 may also be configured to output a temperature signal that indicates the temperature of the sensors in gyroscope 330, which may enable the digital camera 300 to adjust the DC level of the velocity data generated by gyroscope 330. In another embodiment, gyroscope 330 may be configured to output one or more additional signals that correspond to additional dimensions, such as a rotation around the Z-axis. In another embodiment, gyroscope 330 may be supplemented by an accelerometer that provides translational velocity data for the camera in one or more dimensions. Thus the velocity data may include information related to a translation of the image sensor in three dimensions as well as a rotation of the image sensor around three axes.

In one embodiment, gyroscope 330 is configured to sample the velocity data and temperature data every 1 ms. Gyroscope 330 then transmits the captured data to controller 353 via the serial interface. Controller 353 stores the captured velocity data and temperature data in a buffer within processing unit 350. It will be appreciated that controller 353 may store a plurality of samples for each frame of captured video 324. For example, if video is captured at 30 fps, then controller 353 will store approximately 33 samples of velocity data for each frame of video (i.e., each frame corresponds to approximately 33 ms).

During normal operation, raw image sensor data is generated by image sensor 100 in response to a command received from processor 352. For example, in response to a signal from processor 352, image sensor 100 may sample the collected charge at each of the pixel locations (200, 201, etc.) in image sensor 100. In one embodiment, image sensor 100 may be configured to transmit raw image sensor data to image pipeline 351 that corresponds to the sampled intensity values for each pixel location of image sensor 100 (i.e., each pixel location of the raw image sensor data corresponds to an intensity value for one of a plurality of color channels). In another embodiment, image sensor 100 may be configured to calculate a filtered intensity value for each pixel location of image sensor 100 based on the intensity values for a plurality of pixel locations proximate to the particular pixel location of image sensor 100. For example, image sensor 100 may be configured to average a plurality of intensity values in a 3×3 block of pixel locations. In still other embodiments, image sensor 100 may be configured to generate raw image sensor data in a format in which each pixel of the raw image sensor data includes intensity values for a plurality of color channels (such as an RGB format) sampled from a plurality of different pixel locations. Image sensor 100 may be configured to transmit the raw image sensor data over a digital communications interface to digital image processing pipeline 351.

When digital camera 351 is configured to capture video, processor 352 causes image sensor 100 to capture a raw image sensor data at a particular frame rate specified by the format of the captured video. For example, processor 352 may transmit a signal to image sensor 100 approximately every 16.7 ms, which corresponds to a frame rate of 60 fps. Processor 352 also receives the buffered velocity data and/or temperature data from controller 353. The digital image stabilization algorithm calculates a stabilization vector based on the velocity data that is passed to the digital image processing pipeline 351. The digital image processing pipeline 351 then uses the stabilization vector to select a subset of active pixel locations within the raw image sensor data to generate the digital image 322. Digital image processing pipeline 351 then transmits the digital image 322 to memory 320 for storage. Alternately, digital image 322 may be stored in on-chip RAM temporarily and combined with subsequent images to generate a digital video 324. The digital video 324 may be compressed such as with the well-known H.264/MPEG 4 Part 10 codec.

It will be appreciated that one or more other components (not shown) of processing unit 350 may be included such as a local on-chip RAM, a memory interface to communicate with memory 320, or a crossbar for transferring data between digital image processing pipeline 351 and processor 352.

Figure 4:
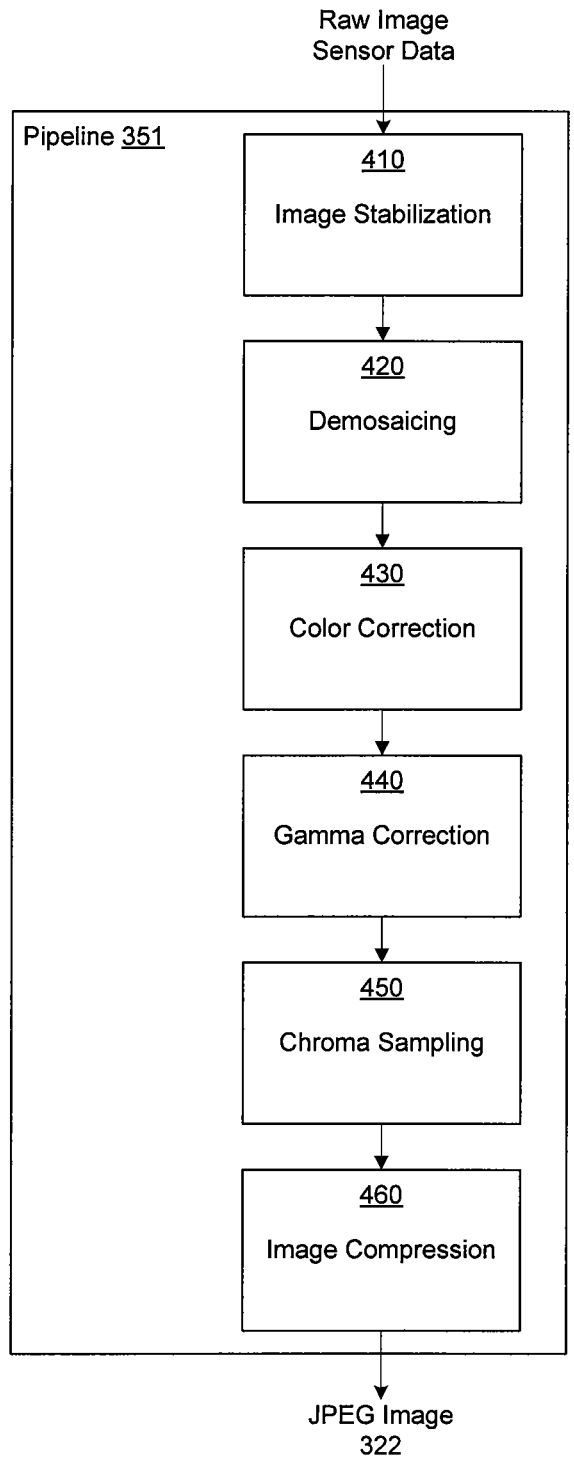
FIG. 4 illustrates a digital image processing pipeline implemented by digital camera of FIG. 3, according to one example embodiment.

FIG. 4 illustrates a digital image processing pipeline 351 implemented by digital camera 300 of FIG. 3, according to one example embodiment. A typical example of a digital image processing pipeline 351 includes an image stabilization block 410, a demosaic processing block 420, a color correction block 430, a gamma correction block 440, a chroma subsampling block 450, and a compression block 460. It will be appreciated that various digital camera manufacturers may implement different processing blocks in digital image processing pipeline 351. For example, some digital image processing pipelines may include a white balance block (not shown), which adjusts the intensities of each color channel such that the mean intensity values associated with each color channel over all pixel locations are equal. Other digital image processing pipelines may not include one or more of the image processing blocks shown in FIG. 4.

As shown, image stabilization block 410 receives the raw image sensor data generated by image sensor 100 and selects a subset of active pixel locations from the raw image sensor data to generate the digital image 322. The image stabilization block 410 determines which pixel locations to include in the subset of active pixel locations based on a stabilization vector received from processor 352. In one embodiment, image sensor 100 includes more pixel locations than are included in the interpolation to produce a digital image 322 at the full resolution of the digital camera 300. For example, a CMOS image sensor with 14.6 MP (4400(H)×3316(V)) is capable of capturing QXGA resolution (2048×1536) digital images using only 4096(H)×3072(V) pixel locations (assuming each 2×2 block of pixel locations, such as implemented using an RGBE CFA, is processed to generate one pixel of the resulting digital image). Thus, if the digital image 322 is created using the subset of active pixel locations centered on the image sensor 100, the intensity values from the left most and right most one-hundred and fifty two (152) pixel locations as well as the intensity values from the top most and bottom most one-hundred and twenty two (122) pixel locations provide a margin of excess pixel locations around the exterior of image sensor 100 that enable digital camera 300 to implement some form of digital image stabilization processing, discussed in more detail below in conjunction with FIGS. 5A-5B, 6 and 7.

Demosaic processing block 420 generates a digital image 322 in an RGB format by processing the raw image sensor data associated with the active pixel locations from image stabilization block 410. Many algorithms for interpolating the raw image sensor data exist in the art, such as nearest neighbor interpolation, bilinear interpolation, or variable gradient interpolation. In a demosaic processing block 420 that implements nearest neighbor interpolation, the intensity value sampled from each pixel location of raw image sensor data is combined with intensity values from two neighboring pixel locations to generate a pixel in a digital image 322 that includes intensity values for all three color channels. For example, the intensity value stored in pixel location 200 may be combined with the intensity values stored in pixel locations 201 and 210 to generate a single pixel in an RGB format. In a demosaic processing block 420 that implements bilinear interpolation, the intensity value stored in each pixel location of raw image sensor data is combined with interpolated intensity values from two or more neighboring pixel locations to generate a single pixel in an RGB format. For example, the intensity value sampled from pixel location 211 is combined with the average of the intensity values sampled from pixel locations 201 and 221 as well as the average of the intensity values sampled from pixel locations 210 and 212 to generate a single pixel in an RGB format.

As is well-known in the art, the demosaicing process results in a reduction in the spatial resolution of raw image sensor data. A pixel of a digital image 322 in an RGB format is associated with three intensity values corresponding to different pixel locations of the image sensor 100. In other words, a pixel is a combination of light intensity measured at three or more different spatial locations. Combining the three intensity values results in a single color for a particular pixel of the digital image 322. Such digital images may include image artifacts such as poorly defined edges and aliasing artifacts such as moire patterns.

Color correction block 430 is applied to the digital image 322 in an RGB format generated by the demosaic processing block 420. The spectral response of image sensor 100 may be different than the spectral response of a human observer. The difference between the captured colors and the colors as observed by a human observer may be due to a variety of factors such as manufacturing variance in the color filter arrays as well as crosstalk between neighboring pixel locations. Therefore, the colors captured by image sensor 100 may be corrected by mapping the captured digital image colorspace to a standard colorspace, such as sRGB.

Conventionally, color correction block 430 is implemented by multiplying each RGB pixel vector by a color correction matrix, as illustrated by Equation (i). The color correction matrix coefficients are chosen to map the captured digital image colorspace to the standard colorspace.

$$\begin{bmatrix} R' \\ G' \\ B' \end{bmatrix} = \begin{bmatrix} C_{RR} & C_{RG} & C_{RB} \\ C_{GR} & C_{GG} & C_{GB} \\ C_{BR} & C_{BG} & C_{BB} \end{bmatrix} \cdot \begin{bmatrix} R \\ G \\ B \end{bmatrix} \quad (i)$$

In addition to the demosaic processing block 420 and the color correction block 430, digital image processing pipeline 351 includes a gamma correction block 440, a chroma subsampling block 450, and a compression block 460. Gamma correction block 440 adjusts the brightness of the RGB values such that the digital image 322, when displayed on a monitor with a non-linear brightness response, properly reproduces the true colors of the captured scene. Chroma subsampling block 450 divides the three color channels into a single luminance channel and two color difference channels. Because human vision responds more to luminance than chrominance, the two color difference channels can be stored with less bandwidth than the luminance channel without reducing the overall quality of the digital image 322. Compression block 460 may take the digital image 322 and compress it into a JPEG format or other well-known compressed image format.

The gamma correction block 440, chroma subsampling block 450, and compression block 460 are conventional processing blocks well-known in the art. As discussed above, these blocks are shown for illustrative purposes in digital image processing pipeline 351, and different processing blocks in addition to or in lieu of these processing blocks are within the scope of the disclosure.

FIG. 5A is a conceptual illustration of active pixel locations of image sensor 100, according to one example embodiment. As shown, pixel locations 266-269, 276-279, 286-289, and 296-299 correspond to active pixel locations that are interpolated by the demosaic processing block 420 to produce a digital image 322. Pixel location 266 corresponds to the upper left pixel location in image sensor 100 that contributes to the digital image 322 when the active pixel locations are centered within image sensor 100. It will be appreciated that although the top margin and left margin of inactive pixel locations in image sensor 100 are shown to be six pixels wide, the actual width of each margin of the image sensor 100 could be any number of pixels and non-uniform (i.e., the left margin and right margin could be a different width than the top margin and bottom margin, or the location of the active pixel locations corresponding to a zero stabilization vector offset could be offset from the center of the image sensor 100 such that the left margin or top margin is not equal to the right margin or bottom margin, respectively).

FIG. 5B is a conceptual illustration of active pixel locations of image sensor 100 for a digital camera 300 that implements digital image stabilization, according to one example embodiment. Processor 352 determines which pixel locations to include in the subset of active pixel locations based on a detected motion of the digital camera 300. In one embodiment, processor 352 filters the sampled velocity data received from gyroscope 330 and integrates the velocity signal over time to calculate a displacement of the digital camera 300 in pixels. Processor 352 then generates a stabilization vector based on the displacement of the digital camera 300. For example, the active pixel locations shown in FIG. 5B are based on a stabilization vector 525 of <−4 px, 2 px>. In other words, a digital image 322 is captured, based on the calculated displacement as determined from the velocity data, by processing the pixel locations in the raw image sensor data starting with pixel location 242, which corresponds to the upper left most pixel in the digital image 322. Ideally, a point in a first frame that is located at pixel location 266 corresponds to a point in the second frame that is located at pixel location 242, where the first frame corresponds to a zero stabilization vector 525 and the second frame corresponds to a stabilization vector 525 of <−4 px, 2 px>, as calculated by the image stabilization algorithm.

In one embodiment, stabilization vector 525 may be specified in sub-pixel increments. In such embodiments, the intensity values corresponding to pixels of the resulting digital image 322 may be interpolated from two or more pixel locations in image sensor 100. For example, stabilization vector 525 could be <−3.5 px, 1.5 px>. Consequently, the calculated intensity value for the upper left most pixel in digital image 322 may be based on intensity values from pixel locations 242, 243, 252 and 253. In other embodiments, any other technically feasible manner of interpolating between pixels may be used, such as bilinear interpolation. The interpolation may be performed on the raw intensity values (i.e., where each pixel location corresponds to a single color component) or may be performed on converted image data in an RGB format.

The stabilization vector 525 is small enough that the active pixel locations corresponding to the stabilization vector 525 are within the confines of the edges of image sensor 100. However, if the total displacement of the digital camera 300 is large enough, the stabilization vector 525 may saturate the image sensor 100 (i.e., the active pixel locations for digital image 322 will correspond to pixel locations outside of the edge of image sensor 100). For example, a stabilization vector 525 of <−7 px, 2 px> in FIG. 5B corresponds to an upper left pixel location to the left of pixel location 240, which is not within the edges of image sensor 100.

Saturation of the image sensor 100 is possible for various reasons. One example where saturation commonly occurs is where a user intentionally pans the digital camera 300. A large motion results in a sustained velocity in a substantially uniform direction that may quickly increase the calculated displacement and, consequently, the stabilization vector 525 such that the active pixel locations for a captured digital image 322 would correspond to pixel locations beyond the edges of image sensor 100. Another example where saturation may occur is when the velocity signal includes a small DC offset that, over time, may cause the stabilization vector to drift, even in the absence of any actual motion of the digital camera 300.

Conventionally, an image stabilization algorithm may correct for saturation of the image sensor 100 by slowly attenuating the calculated displacement. However, the magnitude of the attenuation must be small enough to not adversely affect the operation of the image stabilization algorithm, which means that any large offset created during a panning motion of the digital camera 300 will result in a slow drift of the active pixel locations back to the center of the image sensor 100. Many times the correction continues even after the actual motion of the digital camera 300 is complete. Thus, a viewer may notice a "rubber band" effect that is introduced in the digital video 324 where the camera appears to continue moving at the end of a panning motion. Increasing the magnitude of the attenuation will decrease the extent of the "rubber band" effect after a panning motion, but may have adverse consequences on the effectiveness of the image stabilization algorithm for correcting fast "jittery" motions.

Figure 6:
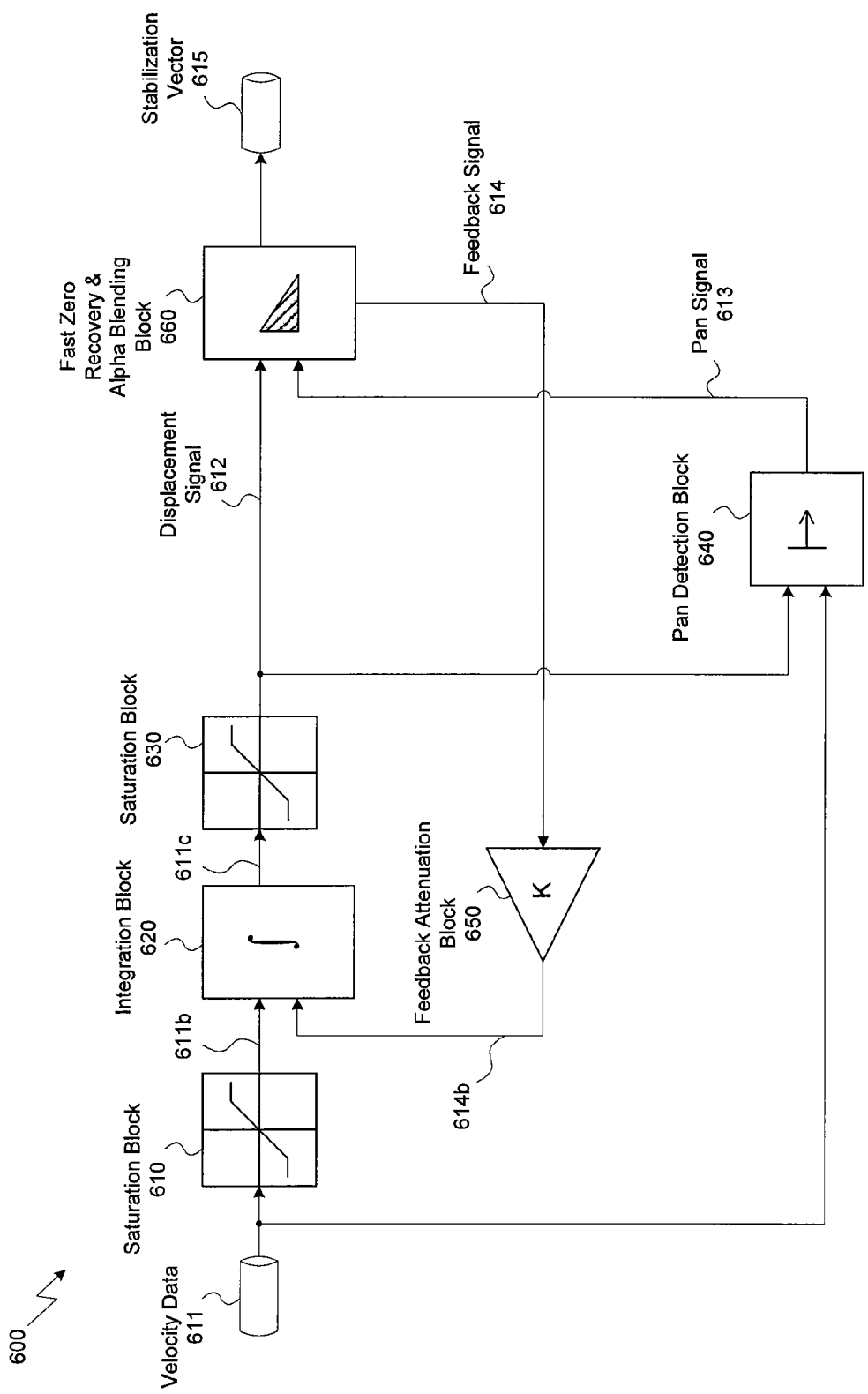
FIG. 6 illustrates a portion of image stabilization algorithm implemented by a digital camera, according to one example embodiment.

FIG. 6 illustrates a portion of an image stabilization algorithm 600 implemented by a digital camera 300, according to one example embodiment. As shown, image stabilization algorithm 600 receives velocity data 611 generated by gyroscope 330. In one embodiment, velocity data 611 is a plurality of buffered samples generated by controller 353. The analog signals from the gyroscope 330 may be sampled at a relatively slow sampling frequency such as 1 kHz. In addition, controller 353 may correct the DC level of the velocity data based on temperature data measured by gyroscope 330. Adjusting the DC level may correlate zero actual motion of the digital camera 300 with a velocity data 611 value of approximately zero. In another embodiment, velocity data 611 may be filtered via a low-pass filter to attenuate high frequency motion or noise in the gyroscope signal. It will be appreciated that signal processing may be performed on either an analog signal within gyroscope 330 or the sampled digital signal in controller 353.

Saturation block 610 receives the velocity data 611 and clamps the velocity data 611 between a high limit and a low limit to generate clamped velocity data 611b. In one embodiment, velocity data 611 are signed 16-bit values, and saturation block 610 may be configured to limit the maximum magnitude of the velocity data 611 recorded by gyroscope 330. In another embodiment, velocity data 611 may be a combination of an unsigned 10-bit or 12-bit value that represents the magnitude of the velocity and a one-bit value that represents the direction of the velocity. It will be appreciated that the format of the velocity data 611 may vary and that velocity data 611 in other formats are within the scope of the present disclosure.

The clamped velocity data 611b is then transmitted to integration block 620 to generate an integrated velocity data 611c that represents the calculated displacement of the digital camera 300 derived from the velocity data 611 generated by the gyroscope 330. The integration block 620 also receives an attenuated feedback signal 614b from a feedback attenuation block 650 that represents an attenuated displacement from the previous sample time. Feedback attenuation block 650 receives the feedback signal 614 from the fast-zero recovery with alpha blending (FZRAB) block 660 and multiplies the feedback signal 614 by a gain that causes the attenuated feedback signal 614b to decay to zero (i.e., the gain is less than 1). Multiplying the feedback signal 614 by the gain causes the displacement signal 612 to constantly drift back towards the center of the image sensor 100.

In one embodiment, the integration block 620 may be configured to multiply the clamped velocity data 611b by a Δt value that corresponds to an elapsed time between successive samples of the velocity data 611 generated by gyroscope 330. For example, in one embodiment, the gyroscope 330 and controller 353 produce velocity data 611 that corresponds to a sampling frequency of 1 kHz. Therefore, integration block 620 could be configured to multiply the clamped velocity data 611b by a Δt equal to 1 ms, which corresponds to the amount of time between successive samples at a sampling frequency of 1 kHz. Integration block 620 then adds the result of the aforementioned calculation to the attenuated feedback signal 614b received from feedback attenuation block 650 to generate integrated velocity data 611c, which is then clamped between a high limit and a low limit by saturation block 630 that operates in a similar manner to saturation block 610 to generate displacement signal 612.

The displacement signal 612 is transmitted to a pan detection block 640. The pan detection block 640 also receives the velocity data 611 generated by gyroscope 330. The pan detection block 640 monitors both the displacement and the velocity of the digital camera 300 to determine whether the detected motion is caused by a panning motion of the digital camera 300. The pan detection block 640 transmits a pan signal 613 to the FZRAB block 660 which determines whether to quickly retrace the stabilization vector 615 back to the center of the image sensor 100. FZRAB block 660 outputs a stabilization vector 615 that specifies a subset of active pixel locations in image sensor 100 that are incorporated into the captured digital image 322 that corresponds to one frame of digital video 324.

Figure 7:
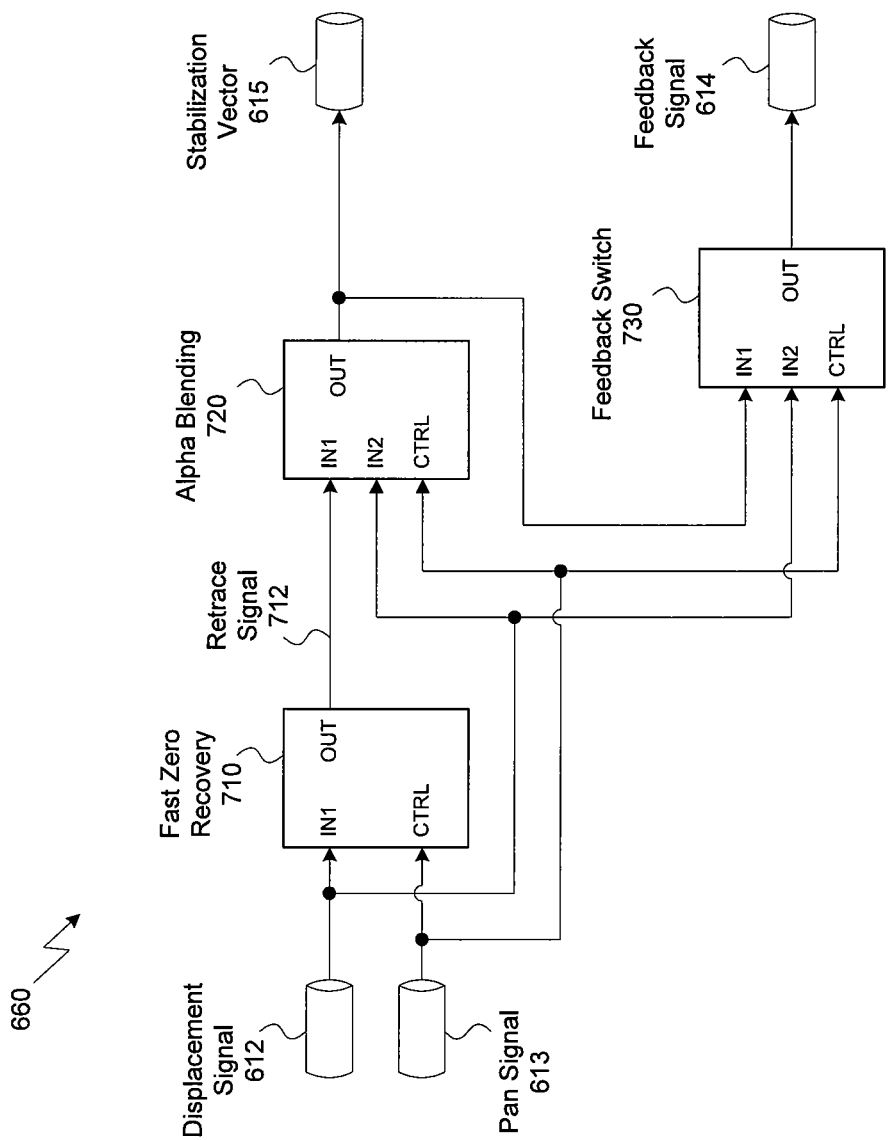
FIG. 7 illustrates the fast-zero recovery and alpha blending block of FIG. 6, according to one example embodiment.

FIG. 7 illustrates the fast zero recovery and alpha blending block 660 of FIG. 6, according to one example embodiment. As shown in FIG. 7, the FZRAB block 660 receives a displacement signal 612 and a pan signal 613 and generates a stabilization vector 615 as well as a feedback signal 614. The displacement signal 612 is received by each of the fast-zero recovery block 710, the alpha blending block 720, and the feedback switch block 730. The pan signal 613 is also received by each of the fast-zero recovery block 710, the alpha blending block 720, and the feedback switch block 730 and is implemented as a control signal that activates or deactivates the operation of the FZRAB block 660.

The fast-zero recovery block 710 receives the displacement signal 612 and generates a retrace signal 712 that traces the displacement back to zero when a panning motion is detected. In one embodiment, the fast zero recovery block 710 traces the displacement back to zero in a linear manner. For example, the fast-zero recovery block 710 may set the retrace signal 712 equal to the displacement signal 612 at the start of the panning motion. Then, for each subsequent sampling time, the fast-zero recovery block 710 may be configured to subtract a fixed number of pixels from the retrace signal 712 at the previous sampling time until the retrace signal 712 is zeroed out. In another embodiment, the fast zero recovery block 710 multiplies the retrace signal 712 by a gain that is less than one such that the attenuated retrace signal 712 approaches a zero value.

The alpha blending block 720 receives the retrace signal 712 from the fast-zero recovery block 710. Based on the state of the pan signal 613, the alpha blending block 720 blends the displacement signal 612 with the retrace signal 712 to generate a stabilization vector 615. In one embodiment, for each sampling time from the start of the panning motion, the alpha blending block 720 calculates a decay rate that begins at unity (1) during the first sampling time after the start of the panning motion. In one embodiment, the decay rate logarithmically decays towards zero (0) over the next five frames of video such that the decay rate is zero at the sampling time corresponding to the sixth frame of video after the start of the panning motion. The alpha blending block 720 then calculates a blended displacement vector ($D_{Blend}$), which is the sum of the retrace signal 712 ($D_{Retrace}$), multiplied by one minus the decay rate (Decay), plus the displacement signal 612 (D), multiplied by the decay rate, as shown by equation (ii).

$$D_{Blend}(n) = D_{Retrace}(n)*(1-\text{Decay}) + D(n)*(\text{Decay}) \quad \text{(ii)}$$

It will be appreciated that during a panning motion, the digital camera is typically moving in a uniform direction and the displacement vector is increasing away from the center of the image sensor 100. Once the panning motion is detected, the retrace signal 712 causes the blended displacement vector to decrease towards zero. The alpha blending block 720 generates a stabilization vector 615 based on the calculated blended displacement vector. In one embodiment, the stabilization vector 615 is a vector in the opposite of the blended displacement vector. For example, if the blended displacement vector represents the motion of the digital camera in a first direction, the stabilization vector 615 represents an offset associated with the active pixel locations of image sensor 100 such that the position of the active pixel locations remains relatively stable.

If the image stabilization algorithm 600 were to switch abruptly from generating the stabilization vector 615 based on the displacement signal 612 to generating the stabilization vector 615 based on the retrace signal 712, the resulting video 324 may include visible artifacts based on the abrupt change in direction of the rate of change of the stabilization vector 615. Consequently, the alpha blending block 720, discussed above, causes a smooth transition between the displacement signal 612 and the retrace signal 712 gradually over a timeframe corresponding to a plurality of frames of video. In this case, the decay rate goes from one to zero in a number of sampling times that corresponds to six frames of video. In other embodiments, other decay rates are contemplated and within the scope of this disclosure.

As also shown in FIG. 7, the feedback switch block 730 is configured to receive the displacement signal 612 as well as the stabilization vector 615 and the pan signal 613. The feedback switch block 730 determines whether to feedback the displacement signal 612 or the displacement associated with the stabilization vector 615 back to the feedback attenuation block 650 of FIG. 6. If the pan signal 613 indicates that the digital camera 300 is not in a panning motion, then the feedback switch block 730 outputs the displacement signal 612 as the feedback signal 614. However, if the pan signal 613 indicates that the digital camera 300 is in a panning motion, then the feedback switch block 730 outputs a displacement associated with the stabilization vector 615 as the feedback signal 614. In alternative embodiments, the fast-zero recovery block 710 and the alpha blending block 720 could be configured to pass the displacement signal 612 through to the output of each block when the pan signal 613 indicates that the digital camera 300 is not in a panning motion. In such embodiments, the stabilization vector 615 may correspond to the displacement signal 612 whenever the digital camera 300 is not panning and feedback switch block 730 may be configured to pass a displacement associated with the stabilization vector 615 back to feedback attenuation block 650.

Figure 8:
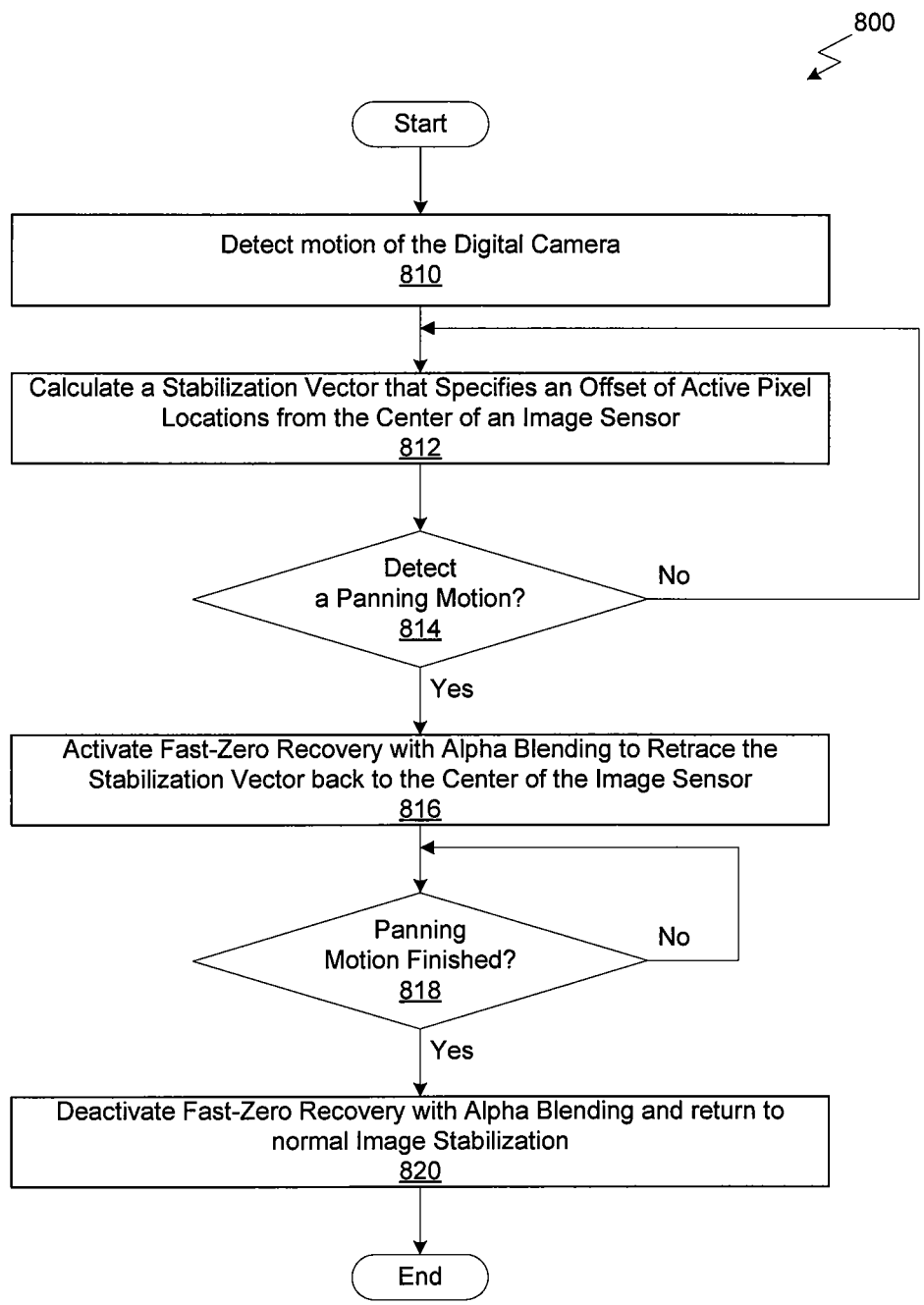
FIG. 8 is a flow diagram of method steps for performing fast-zero recovery with alpha blending in an image stabilization algorithm, according to one example embodiment.

FIG. 8 is a flow diagram of method steps 800 for performing fast zero recovery with alpha blending in an image stabilization algorithm 600, according to one example embodiment. Although the method steps 800 are described in conjunction with the systems of FIGS. 1-7, persons skilled in the art will understand that any system configured to perform the method steps is within the scope of the disclosure.

Method 800 begins at step 810 where digital camera 300 detects a motion of the digital camera 300. In one embodiment, digital camera 300 includes a gyroscope 330 that generates velocity data for the digital camera 300 in one or more dimensions. At step 812, digital camera 300 calculates a stabilization vector 615 that specifies an offset of active pixel locations from the center of an image sensor 100. The stabilization vector 615 may be the opposite of a calculated displacement of the digital camera 300 such that the active pixel locations of image sensor 100 correspond to a relatively stable digital image across multiple frames of video. At step 814, digital camera 300 determines whether the digital camera 300 is in a panning motion. In one embodiment, the digital camera 300 processes the calculated displacement, the velocity, and the direction of motion of the digital camera 300 to determine whether the digital camera 300 is in a panning motion. For example, velocity in a sustained direction for a given number of frames indicates a panning motion. Similarly, high absolute velocities may indicate a panning motion as well as large overall displacement. If the digital camera 300 determines that the digital camera 300 is not in a panning motion, then method 800 returns to step 812 where digital camera 300 calculates a new stabilization vector for the next frame of video 324. However, if the digital camera 300 determines that the digital camera 300 is in a panning motion, then method 800 proceeds to step 816.

At step 816, the digital camera 300 activates fast-zero recovery with alpha blending to retrace the stabilization vector 615 back towards the center of the image sensor 100. At step 818, digital camera 300 determines whether the panning motion is finished. If the panning motion is not finished, then the digital camera 300 continues to retrace the stabilization vector 615 back to the center of the image sensor 100. However, if the panning motion is finished, then method 800 proceeds to step 820 where the digital camera 300 deactivates fast-zero recovery with alpha blending and returns to a normal mode of operation. After step 820, method 800 terminates.

In sum, example embodiments provide systems and methods for performing fast zero recovery with alpha blending in an image stabilization algorithm. A digital camera includes a gyroscope to measure motion of the digital camera. The digital camera processes the signals from the gyroscope to track the total displacement of the image sensor over a series of frames. If the motion is a sustained motion in a uniform direction, then the digital camera recognizes the motion as an intentional panning motion and retraces the displacement to the center of the image sensor. In other words, once the digital camera detects a panning motion, the image stabilization algorithm is reset to begin from the position associated with zero offset of the image sensor at the end of the panning motion.

One embodiment may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments, other and further embodiments may be devised without departing from the basic scope thereof. Therefore, the scope is determined by the claims that follow.

We claim:

1. A method, comprising:
   receiving motion feedback data via a sensor coupled to a processing unit, the motion feedback data indicating motion associated with a digital camera;
   identifying, using the processing unit, a plurality of active pixel locations based on the motion feedback data that comprise a subset of all pixel locations associated with an image sensor of the digital camera, wherein each active pixel location is offset from a corresponding pixel location of the image sensor that is associated with a zero offset;
   determining, using the processing unit and based on the motion feedback data, that the digital camera is being panned; and
   activating, using the processing unit, a fast-zero recovery with alpha blending operation that causes the offset associated with each active pixel location to approach a zero offset during the panning motion,
   wherein the fast-zero recovery with alpha blending operation comprises:
      calculating a displacement vector that represents, for each active pixel location, the offset of each active pixel location from the corresponding pixel location; and
      for each sampling of the motion feedback data:
         generating a retrace vector having a magnitude reduced from that of the displacement vector, and
         blending the displacement vector with the retrace vector to generate a stabilization vector that, when applied to the one or more active pixel locations, causes the offset associated with each active pixel location to approach a zero offset.

2. The method of claim 1, wherein the sensor comprises a gyroscopic sensor that generates velocity data in one or more dimensions.

3. The method of claim 2, wherein the gyroscopic sensor further generates temperature data and is configured to adjust the velocity data based on the temperature data.

4. The method of claim 1, wherein
   generating a retrace vector comprises subtracting a fixed value from each component of the displacement vector.

5. The method of claim 4, wherein blending the displacement vector with the retrace vector comprises:
   calculating a decay rate based on an elapsed time from the start of the panning motion; and
   summing the product of the displacement vector and the quantity one minus the decay rate with the product of the retrace vector and the decay rate.

6. The method of claim 5, wherein the decay rate comprises one at the start of the panning motion and decreases to zero at a subsequent time during the panning motion.

7. The method of claim 1, wherein
   generating a retrace vector comprises multiplying the displacement vector by a gain that is less than one.

8. A non-transitory computer-readable medium including instructions that, when executed by a processing unit, cause the processing unit to perform the steps of:
   receiving motion feedback data via a sensor that indicates motion associated with a digital camera;
   identifying a plurality of active pixel locations based on the motion feedback data that comprises a subset of all pixel locations associated with an image sensor of the digital camera, wherein each active pixel location is offset from a corresponding pixel location associated with the image sensor that has a zero offset;
   determining, based on the motion feedback data, that the digital camera is being panned; and
   activating a fast-zero recovery with alpha blending operation that causes the offset associated with each active pixel location to approach a zero offset during the panning motion
   wherein the fast-zero recovery with alpha blending operation comprises:
      calculating a displacement vector that represents, for each active pixel location, the offset of each active pixel location from the corresponding pixel location; and
      for each sampling of the motion feedback data:
         generating a retrace vector having a magnitude reduced from that of the displacement vector, and
         blending the displacement vector with the retrace vector to generate a stabilization vector that, when applied to the one or more active pixel locations, causes the offset associated with each active pixel location to approach a zero offset.

9. The computer-readable medium of claim 8, wherein the sensor comprises a gyroscopic sensor that generates velocity data in one or more dimensions.

10. The computer-readable medium of claim 9, wherein the gyroscopic sensor further generates temperature data and is configured to adjust the velocity data based on the temperature data.

11. The computer-readable medium of claim 8, wherein the generating a retrace vector comprises subtracting a fixed value from each component of the displacement vector.

12. The computer-readable medium of claim 11, wherein blending the displacement vector with the retrace vector comprises:
   calculating a decay rate based on an elapsed time from the start of the panning motion; and
   summing the product of the displacement vector and the quantity one minus the decay rate with the product of the retrace vector and the decay rate.

13. The computer-readable medium of claim 12, wherein the decay rate comprises one at the start of the panning motion and decreases to zero at a subsequent time during the panning motion.

14. The computer-readable medium of claim 8, wherein generating a retrace vector comprises multiplying the displacement vector by a gain that is less than one.

15. A system, comprising:
   an image sensor associated with a digital camera and including a plurality of pixel locations; and
   a processing unit coupled to the image sensor and configured to:
      receive motion feedback data via a sensor that indicates motion associated with the digital camera,
      identify a plurality of active pixel locations based on the motion feedback data that comprises a subset of all pixel locations associated with the image sensor, wherein each active pixel location is offset from a corresponding pixel location associated with the image sensor that has a zero offset,
      determine, based on the motion feedback data, that the digital camera is being panned, and
      activate a fast-zero recovery with alpha blending operation that causes the offset associated with each active pixel location to approach a zero offset during the panning motion,
   wherein the fast-zero recovery with alpha blending operation comprises:
      calculating a displacement vector that represents, for each active pixel location, the offset of each active pixel location from the corresponding pixel location; and
      for each sampling of the motion feedback data:
         generating a retrace vector having a magnitude reduced from that of the displacement vector, and
         blending the displacement vector with the retrace vector to generate a stabilization vector that, when applied to the one or more active pixel locations, causes the offset associated with each active pixel location to approach a zero offset.

16. The system of claim 15, wherein the sensor comprises a gyroscopic sensor that generates velocity data in one or more dimensions.

17. The system of claim 16, wherein the gyroscopic sensor further generates temperature data and is configured to adjust the velocity data based on the temperature data.

18. The system of claim 15, wherein
   generating a retrace vector comprises subtracting a fixed value from each component of the displacement vector.

19. The system of claim 18, wherein blending the displacement vector with the retrace vector comprises:
   calculating a decay rate based on an elapsed time from the start of the panning motion; and
   summing the product of the displacement vector and the quantity one minus the decay rate with the product of the retrace vector and the decay rate.

20. The system of claim 19, wherein the decay rate comprises one at the start of the panning motion and decreases to zero at a subsequent time during the panning motion.

* * * * *